(12) United States Patent
Jang

(10) Patent No.: US 7,544,145 B2
(45) Date of Patent: Jun. 9, 2009

(54) POWER TRAIN OF AUTOMATIC TRANSMISSION

(75) Inventor: Wook Jin Jang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 280 days.

(21) Appl. No.: 11/582,025

(22) Filed: Oct. 17, 2006

(65) Prior Publication Data

US 2007/0225109 A1 Sep. 27, 2007

(30) Foreign Application Priority Data

Mar. 22, 2006 (KR) .................. 10-2006-0026059

(51) Int. Cl.
*F16H 3/62* (2006.01)

(52) U.S. Cl. .................. 475/280; 475/288; 475/290

(58) Field of Classification Search .................. 475/275, 475/276, 277, 280, 288, 290, 278, 279, 282, 475/284, 286
See application file for complete search history.

(56) References Cited

U.S. PATENT DOCUMENTS

2004/0121876 A1* 6/2004 Usoro et al. ................. 475/275
2006/0052211 A1* 3/2006 Park ........................... 475/275

* cited by examiner

*Primary Examiner*—Richard M. Lorence
*Assistant Examiner*—Edwin A. Young
(74) *Attorney, Agent, or Firm*—Victor E. Johnson; Morgan Lewis & Bockius LLP

(57) ABSTRACT

A power train of an automatic transmission has eight forward gear stages and three reverse gear stages. The power train includes two composite planetary gear sets and seven engagement elements: two clutches and five brakes. Two of the engagement elements are engaged in each gear stage.

15 Claims, 4 Drawing Sheets

FIG. 2

| Shift stage | C1 | C2 | B1 | B2 | B3 | B4 | B5 | Shift ratio | ratio between gear levels |
|---|---|---|---|---|---|---|---|---|---|
| D1 |  |  |  | ● |  | ● |  | 4.082 |  |
| D2 |  |  | ● | ● |  |  |  | 2.915 | 1.400 |
| D3 | ● |  |  | ● |  |  |  | 2.041 | 1.429 |
| D4 |  | ● |  | ● |  |  |  | 1.429 | 1.429 |
| D5 | ● | ● |  |  |  |  |  | 1.000 | 1.429 |
| D6 |  | ● | ● |  |  |  |  | 0.826 | 1.210 |
| D7 |  | ● |  |  |  | ● |  | 0.741 | 1.116 |
| D8 |  | ● |  |  | ● |  |  | 0.588 | 1.259 |
| R1 |  |  |  |  |  | ● | ● | -2.857 |  |
| R2 |  |  | ● |  |  |  | ● | -2.041 | 1.400 |
| R3 | ● |  |  |  |  |  | ● | -1.429 | 1.429 |

|     | D1    | D2    | D3    | D4    | D5    | D6    | D7    | D8    | R1    | R2    | R3    |
|-----|-------|-------|-------|-------|-------|-------|-------|-------|-------|-------|-------|
| ▣ C1 | 0.667 | 0.400 | 0.000 | 0.571 | 0.000 | 0.400 | 0.667 | 1.333 | 0.667 | 0.400 | 0.000 |
| ■ C2 | 0.650 | 0.510 | 0.300 | 0.000 | 0.000 | 0.000 | 0.000 | 0.000 | 1.000 | 1.000 | 1.000 |
| □ B1 | 0.667 | 0.000 | 1.000 | 2.429 | 1.000 | 0.000 | 0.667 | 2.333 | 0.667 | 0.000 | 1.000 |
| □ B2 | 0.000 | 0.000 | 0.000 | 0.000 | 1.000 | 1.700 | 2.167 | 3.333 | 1.167 | 1.633 | 2.333 |
| ■ B3 | 0.500 | 0.700 | 1.000 | 1.429 | 1.000 | 0.700 | 0.500 | 0.000 | 0.500 | 0.700 | 1.000 |
| ▣ B4 | 0.000 | 0.400 | 1.000 | 1.857 | 1.000 | 0.400 | 0.000 | 1.000 | 0.000 | 0.400 | 1.000 |
| ■ B5 | 0.350 | 0.490 | 0.700 | 1.000 | 1.000 | 1.000 | 1.000 | 1.000 | 0.000 | 0.000 | 0.000 |

|  | D1 | D2 | D3 | D4 | D5 | D6 | D7 | D8 | R1 | R2 | R3 |
|---|---|---|---|---|---|---|---|---|---|---|---|
| C1 | 0.000 | 0.000 | 0.750 | 0.000 | 0.525 | 0.000 | 0.000 | 0.000 | 0.000 | 0.000 | 0.750 |
| C2 | 0.000 | 0.000 | 0.000 | 1.000 | 1.700 | 1.405 | 1.259 | 1.000 | 0.000 | 0.000 | 0.000 |
| B1 | 0.000 | 0.429 | 0.000 | 0.000 | 0.000 | 0.174 | 0.000 | 0.000 | 0.000 | 0.429 | 0.000 |
| B2 | 2.082 | 1.487 | 1.041 | 0.429 | 0.000 | 0.000 | 0.000 | 0.000 | 0.000 | 0.000 | 0.000 |
| B3 | 0.000 | 0.000 | 0.000 | 0.000 | 0.000 | 0.000 | 0.000 | 0.412 | 0.000 | 0.000 | 0.000 |
| B4 | 1.000 | 0.000 | 0.000 | 0.000 | 0.000 | 0.000 | 0.259 | 0.000 | 1.000 | 0.000 | 0.000 |
| B5 | 0.000 | 0.000 | 0.000 | 0.000 | 0.000 | 0.000 | 0.000 | 0.000 | 4.857 | 3.469 | 2.429 |

POWER TRAIN OF AUTOMATIC TRANSMISSION

CROSS-REFERENCE TO RELATED APPLICATION

This application claims priority to and the benefit of Korean Patent Application No. 10-2006-0026059, filed in the Korean Intellectual Property Office on Mar. 22, 2006, the entire contents of which are incorporated herein by reference.

BACKGROUND OF THE INVENTION

1. Field of the Invention

The present invention relates to a power train of an automatic transmission and, more particularly, to a power train of an automatic transmission that is capable of implementing eight forward gear stages and three reverse gear stages by using two composite planetary gear sets, two clutches and five brakes.

2. Description of the Related Art

In general, a power train of an automatic transmission is a device for shifting power generated from an engine by multiple stages by using hydraulic pressure to obtain a suitable rotatory force according to driving conditions.

The power train of an automatic transmission includes planetary gear sets for receiving power of the engine and varying it into a suitable rotatory force so as to output it, and engagement elements such as clutches or brakes for fixing rotational elements of the planetary gear sets, restraining rotational movement of them, or rotating them by virtue of power of the engine.

Typically, power trains of automatic transmissions provide four or five forward gear stages. Recently, six, seven, and even eight or more forward gear stages have been developed.

Such power trains typically engage three engagement elements for each gear state. This degrades hydraulic pressure control efficiency and is quite large structurally.

SUMMARY OF THE INVENTION

Embodiments of the present invention provide a power train of an automatic transmission having a compact structure that includes two composite planetary gear sets, two clutches, and five brakes, and implements eight forward speeds and three reverse speeds. Two engagement elements are engaged for each gear stage, thereby enhancing hydraulic pressure control efficiency.

An exemplary embodiment of the present invention provides a power train of an automatic transmission including first to fourth planetary gear sets, each nth planetary gear set including an nth ring gear, an nth sun gear, an nth pinion gear, and an nth carrier; a first clutch unit for connecting the first and second sun gears and the first ring gear; a second clutch for connecting the first, third and fourth ring gears; a brake unit for selectively restraining rotation of the first to fourth sun gears, the first, second and fourth carriers, and the second and fourth ring gears; wherein the first and second carriers are connected, the first and second sun gears are connected, the third ring gear and the fourth carrier are connected, the third and fourth sun gears are connected, the first ring gear is connected to an input shaft, and the third carrier is connected to an output shaft.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 2 shows a table of engagement elements of the power train of the automatic transmission of FIG. 1;

DETAILED DESCRIPTION OF THE PREFERRED EMBODIMENTS

The present invention will be described in detail with reference to the accompanying drawings.

Figure 1:
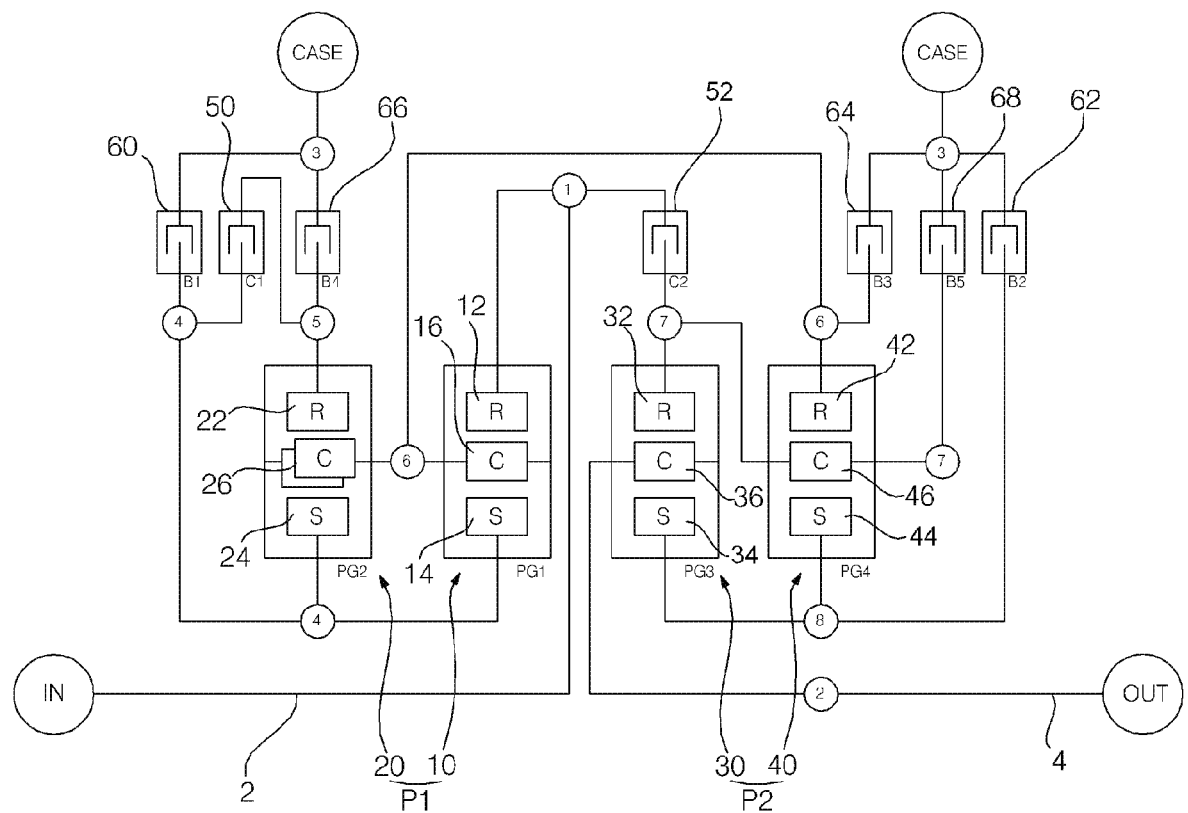
FIG. 1 is a schematic diagram showing the structure of a power train of an automatic transmission according the present invention.
Figure 3:
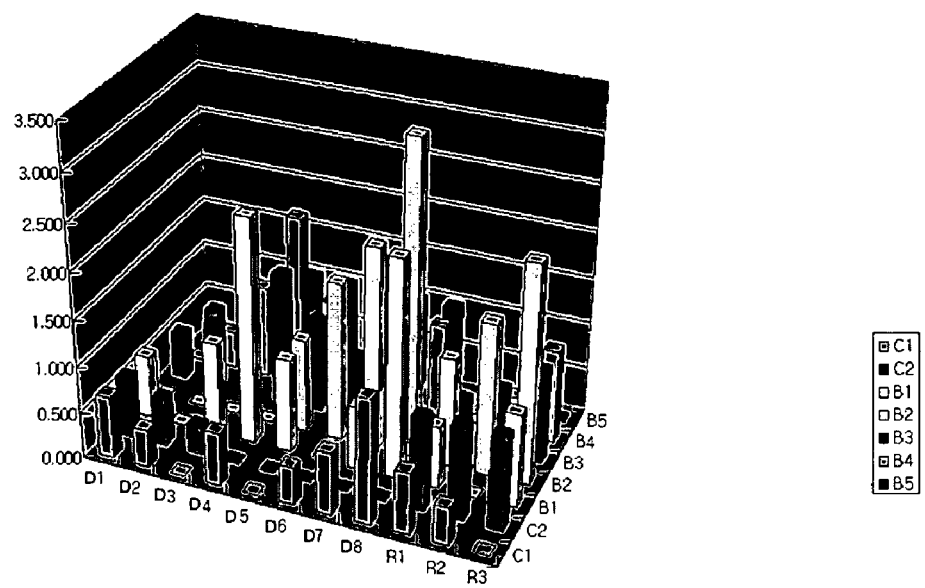
FIG. 3 shows a graph and a table showing relative rotation speed ratios of engagement elements of each stage when eight forward gear stages and three reverse gear stages are implemented in the power train of an automatic transmission of FIG. 1.
Figure 4:
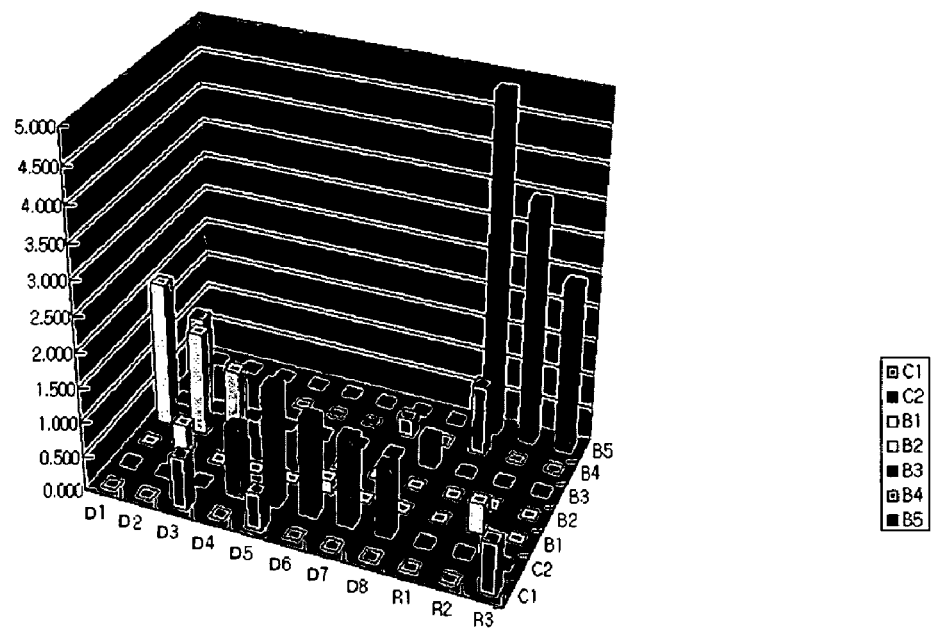
FIG. 4 shows a graph and a table showing reaction torque ratios of the engagement elements of each stage when eight forward gear stages and three reverse gear stages are implemented in the power train of an automatic transmission of FIG. 1.

As shown in FIG. 1, exemplary embodiments of the present invention provide eight forward gear stages and three reverse gear stages. Exemplary embodiments include first and second composite planetary gear sets P1 and P2 that are connected with an input shaft 2 of the automatic transmission, receive power of an engine through the input shaft 2, change the power to a suitable rotatory force, and output it to an output shaft 4 of the automatic transmission; and engagement elements such as clutches 50, 52 and brakes 60, 62, 64, 66, 68 that stop rotational elements of the first and second composite planetary gear sets P1 and P2, restrain rotation of them, or rotate them by virtue of power of the engine.

The first composite planetary gear set P1 can be divided into the first planetary gear set 10 connected with the input shaft 2 of the automatic transmission and the second planetary gear set 20 associated with the first planetary gear set 10.

The first planetary gear set 10 includes a first ring gear 12 directly connected with the input shaft 2 of the automatic transmission, a first sun gear 14 rotatable in the first ring gear 12, and a first pinion gear 16 interposed between the first ring gear 12 and the first sun gear 14. The first pinion gear 16 may be a single type pinion gear.

The second planetary gear set 20 includes a second ring gear 22, a second sun gear 24 directly connected with the first sun gear 14, and a second pinion gear 26 interposed between the second ring gear 22 and the second sun gear 24 and directly connected with the first pinion gear 16. The second pinion gear 26 may be a double type pinion gear.

The first and second planetary gear sets 10 and 20 share a carrier that supports the first and second pinion gears 16 and 26. The first and second sun gears 14 and 24 may be integral to one another. The first and second sun gears 14 and 24 may each have 30 gear teeth and the first and second ring gears 12 and 22 may each have 70 gear teeth.

The second composite planetary gear set P2 can be divided into a third planetary gear set 30 connected with an output shaft 4 of the automatic transmission and a fourth planetary gear set 40 associated with the third planetary gear set 30.

The third planetary gear set 30 includes a third ring gear 32, a third sun gear 34 rotatable in the third ring gear 32, and a third pinion gear 36 interposed between the third ring gear 32 and the third sun gear 34. The third pinion gear 36 may be a single type pinion gear.

The fourth planetary gear set 40 includes a fourth ring gear 42 directly connected with the first and second pinion gears 16 and 26, a fourth sun gear 44 directly connected with the third sun gear 34, and a fourth pinion gear 46 interposed between the fourth ring gear 42 and the fourth sun gear 44 and directly connected with the third ring gear 43. The fourth pinion gear may be a single type pinion gear.

The third and fourth sun gears 34 and 44 may be integral to one another. The third and fourth sun gears 34 and 44 may each have 30 gear teeth and the third and fourth ring gears 32 and 42 may each have 70 gear teeth.

The engagement elements may include a clutch unit for connecting rotational elements of the first and second composite planetary gear sets P1 and P2, and a brake unit for stopping or restraining rotation of each rotational element.

The clutch unit includes a first clutch 50 for connecting the first sun gear 14, the second sun gear 24, and the second ring gear 22. The first clutch 50 allows both first and second sun gears 14 and 24 to be connected with the second ring gear 22. The clutch unit also includes a second clutch 52 for allowing the first and third, ring gears 12, 32 and fourth carrier 46 to be connected simultaneously.

The brake unit includes a first brake 60 for restraining a rotation of the first and second sun gears 14 and 24, a second brake 62 for restraining a rotation of the third and fourth sun gears 34 and 44, a third brake 64 for restraining a rotation of the fourth ring gears 42, first and second pinion gears 16 and 26, a fourth brake 66 for restraining a rotation of the second ring gear 22, and a fifth brake 68 for restraining a rotation of the fourth pinion gear 46.

Symbols enumerated in the horizontal sections in FIG. 2 denote engagement elements. Namely, C1 and C2 denote first and second clutches 50 and 52, and B1 to B5 denote first to fifth brakes 60, 62, 64, 66, and 68.

Symbols enumerated in the vertical sections in FIG. 2 denote shift stages of each speed. Namely, D1-D8 indicate shift stages from a first forward gear stage to an eighth forward gear stage, and R1 to R3 indicate first to third reverse gear stages.

Black circles in the table of FIG. 2 indicate engaging of engagement elements and the blanks indicate releasing of engagement elements.

An up-shifting process will now be described. In a first forward gear stage, the second and fourth brakes 62 and 66 are engaged, and in this case, a shift ratio is 4.082.

When the first forward gear stage is shifted to a second forward gear stage, the fourth brake 66 is released and the first brake 60 is engaged. Namely, the first and second brakes 60 and 62 are engaged. In this case, the shift ratio is 2.915 and a ratio between gear levels is 1.4.

When the second forward gear stage is shifted to a third forward gear stage, the first brake 60 is released and the first clutch 50 is engaged. Namely, the first clutch and the second brakes 62 are engaged. In this case, the shift ratio is 2.041 and the ratio between gear levels is 1.429.

When the third forward gear stage is shifted to a fourth forward gear stage, the first clutch 50 is released and the second clutch 52 is engaged. Namely, the second clutch 52 and the second brake 62 are engaged. In this case, a shift ratio is 1.429 and the ratio between levels is 1.429.

When the fourth forward gear stage is shifted to a fifth forward gear stage, the second brake 62 is released and the first clutch 50 is engaged. Namely, the first and second clutches 50 and 52 are engaged. In this case, the shift ratio is 1.0, and the ratio between gear levels is 1.429.

When the fifth forward gear stage is shifted to a sixth forward gear stage, the first clutch 50 is released and the first brake 60 is engaged. Namely, the second clutch 52 and the first brake 60 are engaged. In this case, the shift ratio is 0.826, and the ratio between gear levels is 1.210.

When the sixth forward gear stage is shifted to a seventh forward gear stage, the first brake 60 is released and the fourth brake 66 is engaged. Namely, the second clutch 52 and the fourth brake 66 are engaged. In this case, the shift ratio is 0.741, and the ratio between gear levels is 1.116.

When the seventh forward gear stage is shifted to an eighth forward gear stage, the fourth brake 66 is released and the third brake 64 is engaged. Namely, the second clutch 52 and the third brake 64 are engaged. In this case, the shift ratio is 0.588, and the ratio between gear levels is 1.259.

The up-shifting process is performed as described above, and a down-shifting process is performed in the reverse order of the up-shifting process, so detailed description of the down-shifting process will be omitted.

A process of skip-shifting by two or three gear stages from the fourth, fifth, sixth, seventh and eighth forward gear stages of the power train of the automatic transmission according to the present invention will be described as follows.

In the eighth forward gear stage in which the second clutch 52 and the third brake 64 are engaged, when the third brake 64 is released and the first brake 60 is engaged, the eighth forward gear stage is skip-shifted to the sixth forward gear stage.

In the eighth forward gear stage in which the second clutch 52 and the third brake 64 are engaged, when the third brake 64 is released and the first clutch 50 is engaged, the eighth forward gear stage is skip-shifted to the fifth forward gear stage.

In the seventh forward gear stage in which the second clutch 52 and the fourth brake 66 are engaged, when the fourth brake 66 is released and the first clutch 50 is engaged, the seventh forward gear stage is skip-shifted to the fifth forward gear stage.

In the seventh forward gear stage in which the second clutch 52 and the fourth brake 66 are engaged, when the fourth brake 66 is released and the second brake 62 is engaged, the seventh forward gear stage is skip-shifted to the fourth forward gear stage.

In the sixth forward gear stage in which the second clutch 52 and the first brake 60 are engaged, when the first brake 60 is released and the second brake 62 is engaged, the sixth forward gear stage is skip-shifted to the fourth forward gear stage.

In the sixth forward gear stage in which the second clutch 52 and the first brake 60 are engaged, when the second clutch 52 and the first brake 60 are released and the first clutch 50 and the second brake 62 are engaged, the sixth forward gear stage is skip-shifted to the third forward gear stage.

In the fifth forward gear stage in which the first and second clutches 50 and 52 are engaged, when the second clutch 52 is released and the second brake 62 is engaged, the fifth forward gear stage is skip-shifted to the third forward gear stage.

In the fifth forward gear stage in which the first and second clutches 50 and 52 are engaged, when the first and second clutches 50 and 52 are released and the first and second brakes 60 and 62 are engaged, the fifth forward gear stage is skip-shifted to the second forward gear stage.

In the fourth forward gear stage in which the second clutch 52 and the second brake 62 are engaged, when the second clutch 52 is released and the first brake 60 is engaged, the fourth forward gear stage is skip-shifted to the second forward gear stage.

In the fourth forward gear stage in which the second clutch 52 and the second brake 62 are engaged, when the second clutch 52 is released and the fourth brake 66 is engaged, the fourth forward gear stage is skip-shifted to the first forward gear stage.

In the third forward gear stage in which the first clutch 50 and the second brake 62 are engaged, when the first clutch 50 is released and the fourth brake 66 is engaged, the third forward gear stage is skip-shifted to the first forward gear stage.

An up-shifting skip-shifting process is performed in the reverse order of the down-shifting skip-shifting process, so a detailed description of the up-shifting skip-shifting process will be omitted.

A reverse up-shifting process will be described. When the fourth and fifth brakes 66 and 68 are engaged, a first reverse gear stage shifting is enabled. In this case, the shift ratio is −2.857.

When the first reverse gear stage is shifted to a second reverse gear stage, the fourth brake 66 is released and the first brake 60 is engaged. Namely, the first and fifth brakes 60 and 68 are engaged. In this case, the shift ratio is −2.041 and the ratio between gear levels is 1.4.

When the second reverse gear stage is shifted to a third reverse gear stage, the first brake 60 is released and the first clutch 50 is engaged. Namely, the first clutch 50 and the fifth brake 68 are engaged. In this case, the shift ratio is −1.429, and the ratio between gear levels is 1.429.

A reverse down-shifting process is performed in the reverse order of the above-described up-shifting process, so descriptions therefor will be omitted.

As described above, a power train of an automatic transmission according to embodiments of the present invention has advantages in that it can implement eight forward gear stages and three reverse gear stages with a compact structure by including two composite planetary gear sets, two clutches, and five brakes. Because only two engagement elements are engaged to shift each gear stage, the hydraulic control efficiency is enhanced and the capacity of a pump for pumping the hydraulic pressure is reduced.

While this invention has been described in connection with what is presently considered to be the most practical and preferred embodiments, it is to be understood that the invention is not limited to the disclosed embodiments, but, on the contrary, is intended to cover various modifications and equivalent arrangements included within the sprit and scope of the appended claims.

What is claimed is:

1. A power train of an automatic transmission comprising:
   a first planetary gear set comprising a first ring gear, a first sun gear, a first pinion gear, and a first carrier;
   a second planetary gear set comprising a second ring gear, a second sun gear, a second pinion gear, and a second carrier;
   a third planetary gear set comprising a third ring gear, a third sun gear, a third pinion gear, and a third carrier;
   a fourth planetary gear set comprising a fourth ring gear, a fourth sun gear, a fourth pinion gear, and a fourth carrier;
   a first clutch for connecting the first and second sun gears and the second ring gear;
   a second clutch for connecting the first and third ring gears and fourth carrier; and
   a brake unit for selectively restraining rotation of the sun gears, the carriers, and the ring gears;
   wherein the first and second carriers are connected;
   the first and second sun gears are connected;
   the third ring gear and the fourth carrier are connected;
   the third and fourth sun gears are connected;
   the first ring gear is connected to an input shaft; and
   the third carrier is connected to an output shaft.

2. The power train of claim 1, further comprising eight forward speeds and three reverse speeds.

3. The power train of claim 2, wherein said eight forward speeds comprise first through eighth speeds, and skip-shifting can occur from the first to the third speed, from the second speed to the fourth or fifth speed, from the third speed to the first, fifth, or sixth speed, from the fourth speed to the first, second, sixth, or seventh speed, from the fifth speed to the second, third, seventh, or eighth speed, from the sixth speed to the third, fourth, or eighth speed, from the seventh speed to the fourth or fifth speed, and from the eighth speed to the fifth or sixth speed.

4. The power train of claim 1, wherein the first pinion gear comprises a single type pinion gear.

5. The power train of claim 1, wherein the second pinion gear comprises a double type pinion gear.

6. The power train of claim 1, wherein the third pinion gear comprises a single type pinion gear.

7. The power train of claim 1, wherein the fourth pinion gear comprises a single type pinion gear.

8. The power train of claim 1, wherein the first clutch part allows the second ring gear to be connected to both first and second sun gears.

9. The power train of claim 8, wherein the brake unit comprises
   a first brake for simultaneously restraining rotation of the first and second sun gears;
   a second brake for simultaneously restraining rotation of the third and fourth sun gears;
   a third brake for simultaneously restraining rotation of the first and second carriers and the fourth ring gear;
   a fourth brake for restraining rotation of the second ring gear, and
   a fifth brake for restraining rotation of the fourth carrier.

10. The power train of claim 9, wherein:
    the second and fourth brakes are engaged at a first forward speed;
    the first and second brakes are engaged at a second forward speed;
    the first clutch and the second brake are engaged at a third forward speed;
    the second clutch and the second brake are engaged at a fourth forward speed;
    the first and second clutches are engaged at a fifth forward speed;
    the second clutch and the first brake are engaged at a sixth forward speed;
    the second clutch and the fourth brake are engaged at a seventh forward speed;
    the second clutch and the third brake are engaged at an eighth forward speed;
    the fourth and fifth brakes are engaged at a first reverse speed;
    the first and fifth brakes are engaged at a second reverse speed; and
    the first clutch and the fifth brake are engaged at a third reverse speed.

11. The power train of claim 1, wherein the brake unit comprises a brake for simultaneously restraining rotation of the first and second sun gears.

12. The power train of claim 1, wherein the brake unit comprises a brake for simultaneously restraining rotation of the third and fourth sun gears.

13. The power train of claim 1, wherein the brake unit comprises a brake for simultaneously restraining rotation of the first and fourth ring gears.

14. The power train of claim 1, wherein the brake unit comprises a brake for restraining rotation of the second ring gear.

15. The power train of claim 1, wherein the brake unit comprises a brake for restraining rotation of the fourth carrier.

* * * * *